United States Patent [19]

Winters

[11] Patent Number: 4,873,801
[45] Date of Patent: Oct. 17, 1989

[54] METHOD AND APPARATUS FOR SEALING AND PROTECTING LOADING DOCK DOORWAYS

[76] Inventor: William L. Winters, 2975 Haywood Ave., Chattanooga, Tenn. 37415

[21] Appl. No.: 276,965

[22] Filed: Nov. 28, 1988

[51] Int. Cl.⁴ ............................................. E04H 14/00
[52] U.S. Cl. ................................................. 52/173 DS
[58] Field of Search ............................ 52/173 DS, 173

[56] References Cited

U.S. PATENT DOCUMENTS

| | | | |
|---|---|---|---|
| 4,070,801 | 1/1978 | O'Neal | 52/173 DS X |
| 4,554,768 | 11/1985 | Siajer | 52/173 DS |
| 4,574,543 | 3/1986 | Crosson | 52/173 DS |
| 4,799,342 | 1/1989 | Klevnjans | 52/173 DS |

Primary Examiner—Carl D. Friedman
Assistant Examiner—Creighton Smith
Attorney, Agent, or Firm—Wm. Randall May

[57] ABSTRACT

A simple dock seal and guard having wear resistant, wear reducing and self-positioning characteristics for use around loading dock doorways. The dock seal comprises a pair of mounting brackets, a rocker arm assembly and multiple overlapping vertical sealing strips. The rocker arm assembly includes two arms, each having an inner end and an outer end, counterweight support means, horizontal counterweighting bars and a horizontal anchoring bar. The rocker arms are each rotatably attached to one of the mounting brackets generally in the center of the rocker arm. The rocker arms rotate, as a result of the attachment of the counterweighting bars, in a manner whereby the outer ends of the rocker arms are higher than the inner ends when said arms are at rest. The strips are fabricated of resilient, abrasion-resistant material and the free ends of some of said sealing strips have weights attached to them. When a docking vehicle is backed up to the loading dock, the sealing strips tend to wrap around the end of the vehicle forming a weather and conditioned-air seal while at the same time protecting the doorway structure. During the docking operation the outer ends of the rocker arms are pulled down by friction between the sealing strips and the docking vehicle. As a vehicle moves in and out of docking position and up and down during periods of unloading and loading, the sealing strips automatically track the movement of the vehicle. This tracking operation minimizes the tensile stress on the sealing strips and minimizes the relative movement between the strips and the vehicle.

14 Claims, 3 Drawing Sheets

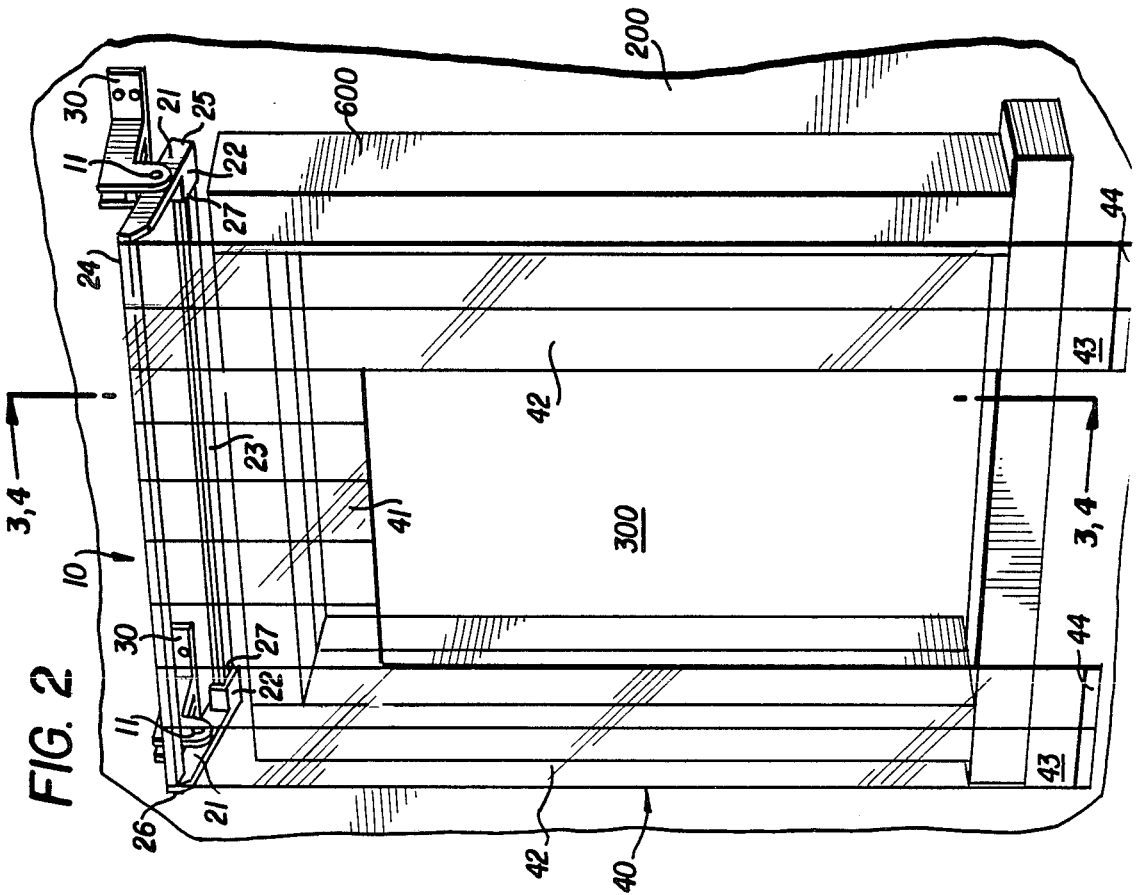
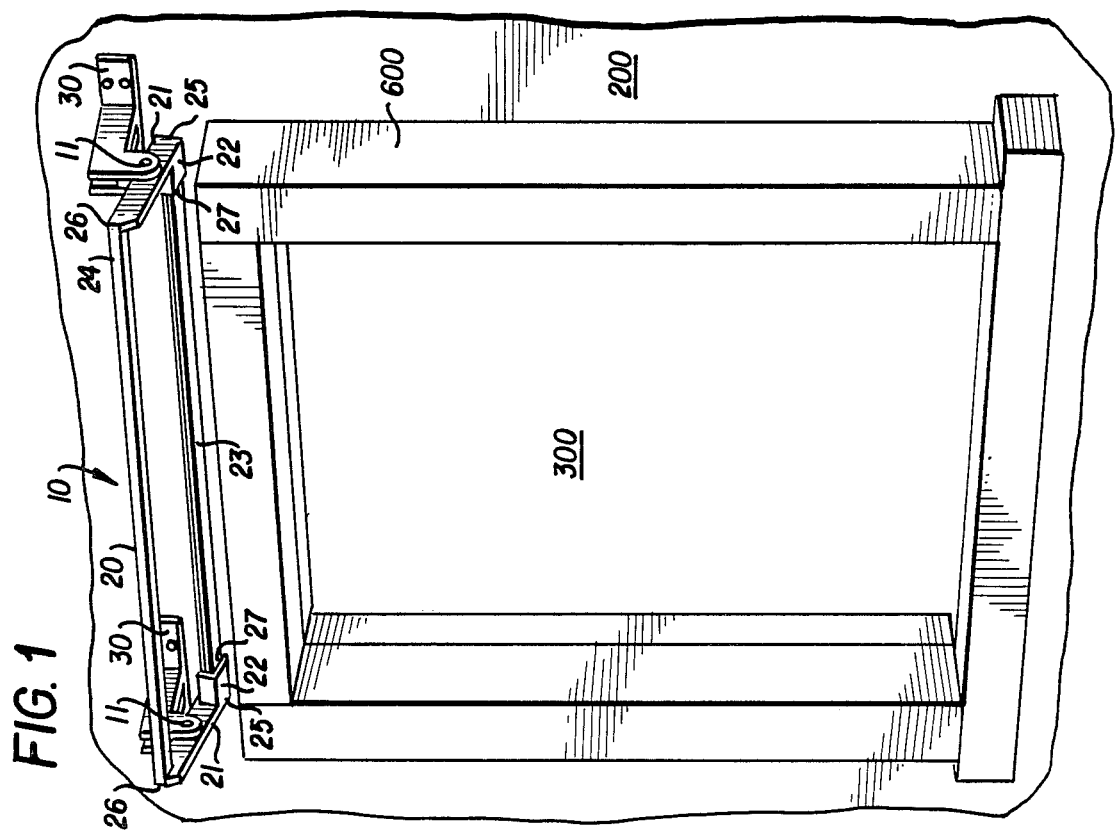

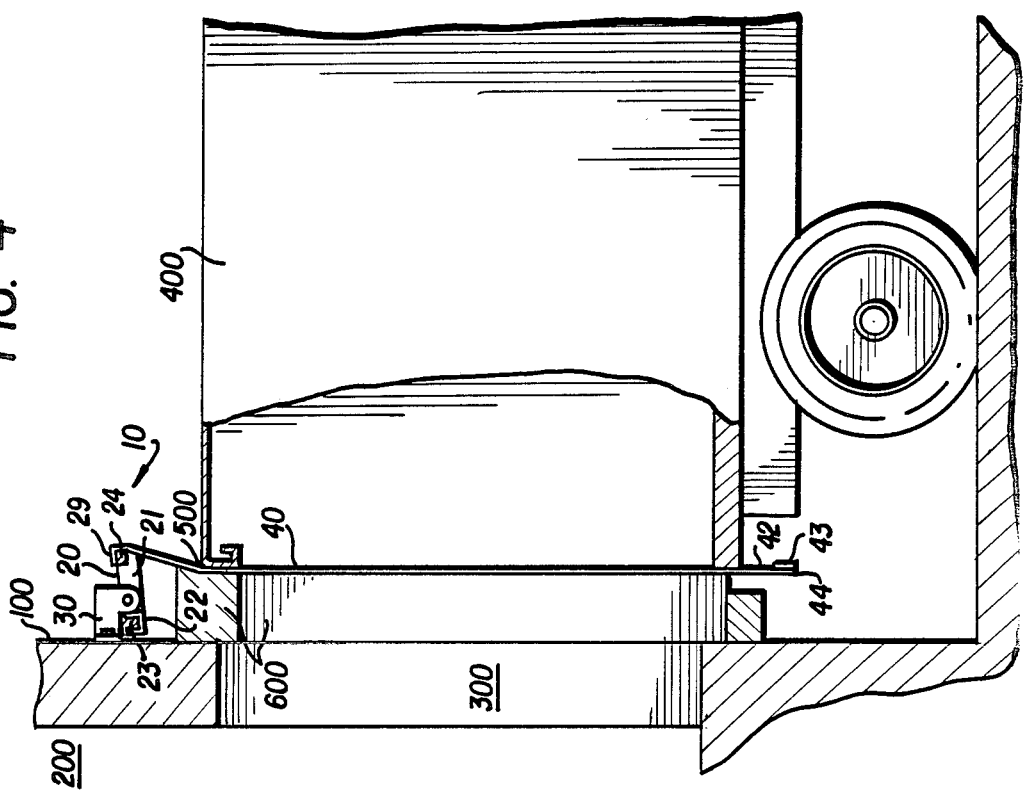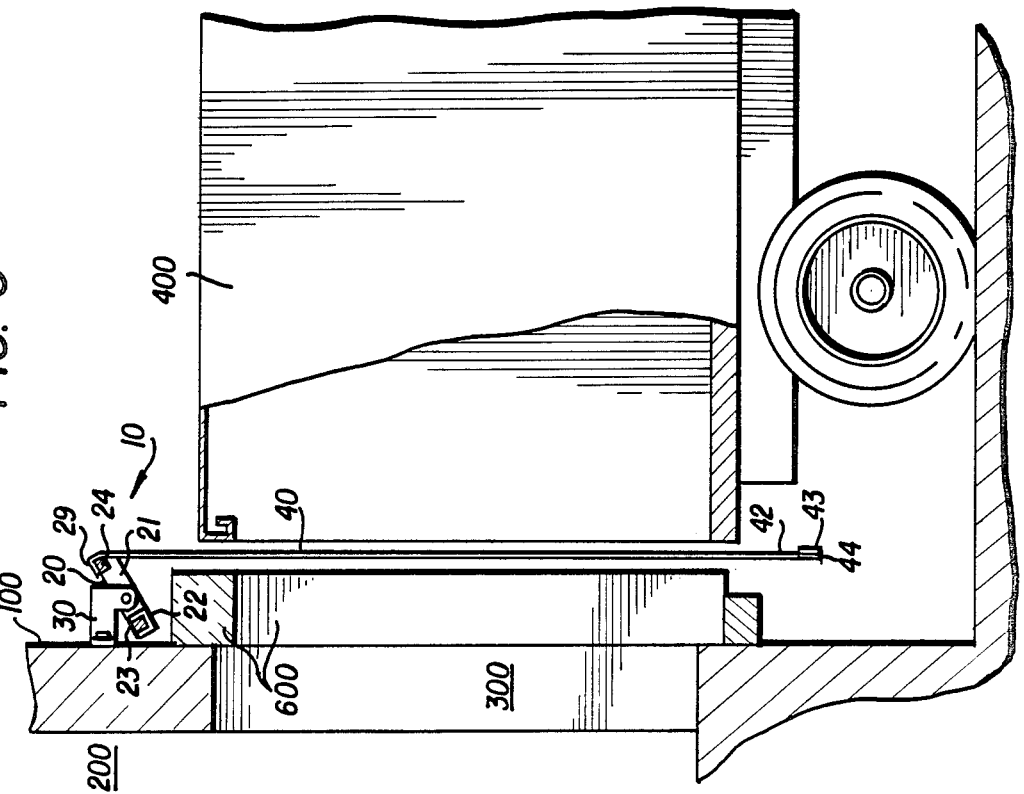

METHOD AND APPARATUS FOR SEALING AND PROTECTING LOADING DOCK DOORWAYS

BACKGROUND OF THE INVENTION

I. Field of the Invention

This invention relates to loading dock doorway seals and to the protection of loading dock doorway structure, padding, cushioning, or shelters, and in particular, to self-positioning, wear resistant, loading dock seals and guards.

II. Prior Art and Other Considerations

The doorway seal and guard of the present invention is an improvement over prior art seals such as those shown in U.S. Pat. Nos. 3,375,625 and 4,554,768 and is particularly adapted to be utilized in conjunction with such or other similar seals.

Loading dock doorway seals are employed around doorways and access openings in walls of buildings and were developed to seal gaps between docking vehicles and the building to keep out inclement or undesirable weather, to keep in conditioned air, and to protect the building or doorway structure from the repetitive impact and abrasion of docking vehicles.

Prior art seals generally are designed to be of stationary or "fixed" construction, or are designed to be manually adjustable to accommodate the differing heights of docking vehicles. Stationary or "fixed" seals usually are constructed of compressible material, frequently fabric covered, and are of various configurations. Manually adjustable seals are generally more elaborate, and therefore more complex, utilizing techniques involving cables, springs, pulleys, tracks and/or straps or a combination of these or other devices in order to manually adjust the top seal or pad to accommodate and seal off the gap between a docked truck body and the upper edge of a loading dock doorway. The most obvious problems with fixed or stationary loading dock seals or cushions are that they cannot be adjusted to seal gaps caused by different vehicles of varying heights, are easily damaged and require frequent replacement or repair. Problems with loading dock seals with adjustable top seals presently in use are that they must be manually adjusted, either before or after the vehicle engages the loading dock, thereby requiring the assistance of a human operator; they generally require precise engagement by the vehicle operator to be effective; they are generally ineffective in longterm protection of the building structure or doorway padding; and they are particularly susceptible to friction, abrasion, impact, and compression damage due to the nature of their construction and the materials used.

An additional problem with prior art seals, whether of the stationary or "fixed" construction type or of the manually adjustable variety, is that they generally employ solid or continuous top seal padding, cushioning or other compressible material to span the width of the opening at the top of the loading dock doorway. These prior art top seals are necessarily designed to extend below the top edge of docking vehicles. Such construction and positioning greatly enhances the probability of top seal impact damage caused by protruding objects, such as masts or pipes, typically associated with loading vehicles, such as lift trucks, as these vehicles enter and leave the docked vehicle during the loading and unloading operation.

SUMMARY OF THE INVENTION

In view of the foregoing, it is an object of the present invention to provide a method and apparatus for effectively sealing loading dock doorways in a simple manner which minimizes wear and damage to seal and doorway structure.

It is an advantage of the present invention to provide a method and apparatus for a loading dock seal that is self-positioning thereby eliminating the necessity of manual or human intervention for proper operation of the seal.

It is an advantage of the present invention to provide a method and apparatus for a loading dock seal which will effectively seal out inclement or undesirable weather and seal in conditioned air during docking operations and post docking activities.

It is an advantage of the present invention to provide a method and apparatus for a loading dock seal to effectively accommodate varying sizes of vehicles.

Another advantage of the present invention is to provide a method and apparatus for a loading dock seal to effectively protect loading dock doorway structure, padding, cushioning and/or doorway shelters against damage typically associated with, or caused by, docking vehicles and other objects, such as hinges, which protrude from docking vehicles.

Another advantage of the present invention is to provide a method and apparatus for a loading dock seal to track the movement of an engaging vehicle thereby minimizing seal damage due to friction, abrasion, compression, or stretching.

Another advantage of the present invention is to provide a method and apparatus for a loading dock seal to provide for the use of vertically split, overlapping curtain sections of resilient, abrasion-resistant material for improved durability, flexibility and protection.

A further advantage of the present invention is to provide a method and apparatus for a loading dock seal to be economical and virtually maintenance free, and to have improved durability and ease of use.

An additional advantage of the present invention is to provide a method and apparatus for a loading dock seal to utilize vertically split, side sealing curtain sections with overlapping construction whereupon weights are attached to the bottom edges of said curtain sections to provide for curtain stability during non-use and to provide for proper sealing tension against the sides of a docked vehicle.

A further advantage of the present invention is to provide a method and apparatus for a loading docking seal to utilize vertically split, curtain sections with overlapping construction which, when extended below the roofline of docked vehicles, will not interfere with or obstruct the operation of loading vehicles such as lift trucks during the unloading or loading operation.

Yet another advantage of the present invention is to provide a method and apparatus for a loading dock seal to utilize vertically split, curtain sections with overlapping construction which extend below the roofline of docking vehicles to effectively protect existing loading dock top seal structure or padding from impact or abrasion damage caused by loading vehicles, such as lift trucks, entering and exiting the docked vehicle during the loading or unloading operation.

According to the invention, a loading dock doorway seal comprises a curtain means and a positioning means. The positioning means moves the curtain means in a manner whereby an effective weather and conditioned-air seal between a docking vehicle and a loading dock doorway is accomplished while minimizing wear and damage to the curtain means and to the loading dock doorway structure due to friction, abrasion and impact compression by allowing the curtain means to track the movement of the docking vehicle.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a perspective view of a loading dock seal and protector according to an embodiment of the invention shown operatively mounted, without curtain sealing sections attached, on a building above a padded loading dock doorway.

FIG. 2 is a perspective view of the apparatus of FIG. 1 with curtain sealing sections attached.

FIG. 3 is a sectioned side view of a loading dock seal and protector of FIG. 2, taken along the line 3—3, embodying and illustrating the principles of the present invention in an unengaged position.

FIG. 4 is a sectioned side view of the loading dock seal and protector of FIG. 2, taken along the line 4—4, embodying and illustrating the principles of the present invention in an engaged position.

DETAILED DESCRIPTION OF THE DRAWINGS

Figure 5:
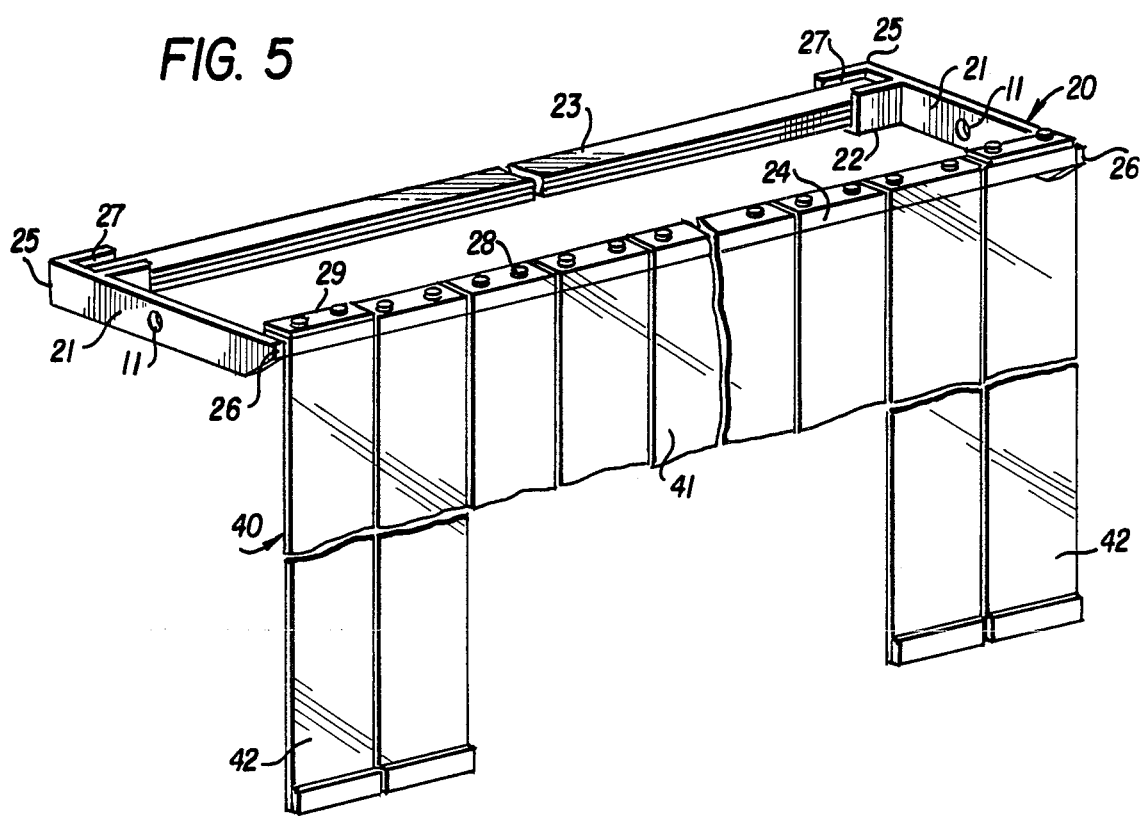
FIG. 5 is an overhead, frontal, perspective view of a rocker arm assembly and mounting bracket assembly shown with counterweights and vertical sealing strips installed.

A loading dock doorway seal and protector (10) embodying the principles of the present invention is shown in the drawings to illustrate a present preferred embodiment of the invention. In FIGS. 1 and 2 the loading dock doorway seal and protector (10) is shown mounted to an outside wall (100) of a building (200) just above a typical padding structure (600) of a typical loading dock doorway (300). FIG. 3 and FIG. 4 show the invention similarly mounted in an unengaged position and in an engaged position respectively.

Referring now particularly to FIG. 2 and FIG. 5, the loading dock doorway seal and protector (10) is comprised of the following major components: a rocker arm assembly (20); mounting brackets (30) for supporting said rocker arm assembly (20); and, a plurality of vertically split, overlapping sealing strips (40) which are grouped and positioned to sealably engage a docking vehicle along the top and side edges of said docking vehicle.

Said rocker arm assembly (20) comprises a pair of rocker arms (21); a pair of counterweight support means (22); counterweighting means (23); and, a seal anchoring means (24).

Said rocker arms (21) are bars, generally rectangular in shape, and are of sturdy, preferrably metallic, construction. Each arm (21) has an inner end (25) and an outer end (26) and a coincidental axis point (11) relative to the other arm (21) through which said arm (21) is rotatably attached to said mounting bracket (30). Securely attached to said inner end (25) of each rocker arm (21) is one of the counterweight support means (22). Securely attached to, and horizontally between, said outer ends (26) of said rocker arms (21) is the seal anchoring means (24).

Said counterweight support means (22) are generally of "U" shaped configuration which form open-ended cradles (27) when perpendicularly attached to the inner ends (25) of said rocker arms (21).

Said counterweighting means (23) are bars, rectangular in shape and are of heavy metal, preferrably steel, construction. Said bars (23) are stackably positioned between said inner ends (25) of said rocker arms (21) in a manner whereby the ends of said bars (23) nest within the space formed by the open-ended cradles (27) of said counterweight support means (22) and are supported thereby.

Said seal anchoring means (24) is of tubular construction and is fabricated of sturdy, but light, preferrably aluminum, material for supporting the vertically split, overlapping sealing strips (40).

Figure 6:
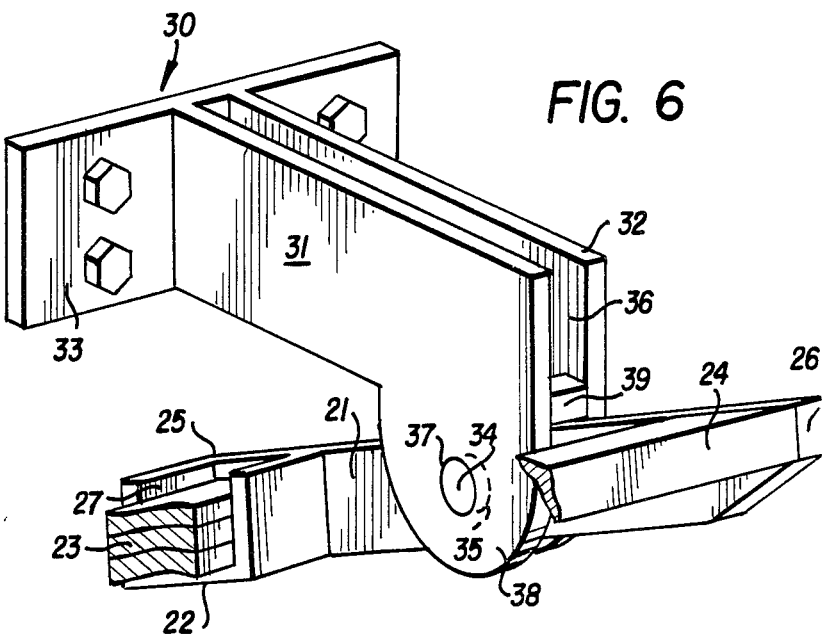
FIG. 6 is a sectioned, side, perspective view of a typical mounting bracket assembly attached to a typical rocker arm assembly as shown in FIG. 3.

As shown in FIG. 6, said mounting brackets (30) are generally of an "L" shaped configuration each having a left plate (31) and a right plate (32) and a base plate (33). Said left plate (31) and said right plate (32) of said mounting bracket (30) are each vertically and perpendicularly attached to said base plate (33) at one end and are spaceably positioned to be parallel to each other thereby forming a slot (36). Said slot (36) is of sufficient width necessary to allow said rocker arms (21) of said rocker arm assembly (20) to slide between said left and right plates (31) and (32). The unattached ends of said left and right plates (31) and (32) of each mounting bracket (30) are shaped to form a semi-circular arc (38). At the center of said semi-circular arc (38) is a hole (37) of sufficient diameter to snugly receive a retaining means such as a pin (34) and bushing (35) for rotatably securing said rocker arms (21) to said mounting bracket (30) through said coincidental axis points (11) of said arms (21). A stop (39) for restricting the upward movement of the outer ends (26) of said rocker arms (21) is positioned within said slot (36) formed by said left and right plates (31) and (32) and is securely attached to said left and right plates (31) and (32). Said mounting brackets (30) are each securely attached through their base plates (33) to said outside wall (100) of said building (200) generally just above and to either side of said typical loading dock doorway (300).

The vertically split, overlapping sealing strips (40) are securely attached to said seal anchoring bar (24) by bolts (28) and/or bolted plates (29) and are grouped into a top curtain section (41) and two side curtain sections (42) which are positioned on said seal anchoring bar (24) to border the top and sides of said loading dock doorway (300). The sealing strips (40) comprising the top curtain section (41) are of sufficient length to sealably engage the top edge of docking vehicles of different heights. The sealing strips (40) comprising the side curtain sections (42) are weighted with a weighting means (43) attached to the bottom edge (44) of each side sealing curtain strip (40) to provide for curtain stability during non-use as well as to provide for proper sealing tension against the sides of a docked vehicle. The sealing strips (40) are constructed of resilient, abrasion-resistant material such as flexible polyvinylchloride.

For proper operation, said counterweighting bars (23) should be of slightly more weight than is necessary to counterbalance the weight of said outer end (26) of said rocker arm assembly (20), with said sealing strips (40) attached, thereby causing the entire rocker arm assembly (20) to rotate on its coincidental axis points (11). This rotating action causes said outer end (26) of said assembly (20) to be higher than said inner end (24) when said assembly (20) is in an unengaged position as shown in FIG. 3.

Referring now to FIG. 3 and FIG. 4, in operation, as a docking vehicle (400) approaches the loading dock doorway (300), it comes into contact with said sealing strips (40). As said vehicle (400) continues it approach, friction between said strips (40) and said vehicle (400) inhibit said strips (40) from sliding with respect to said vehicle (400) thereby creating a generally downward force on said strips (40) at said seal anchoring bar (24). This action causes said rocker arm assembly (20) to tend to rotate on its coincidental axis points (11) allowing said sealing strips (40) to track the movement of said docking vehicle (400) to its docked position (500). This self-positioning or tracking characteristic of the present invention greatly reduces wear, tear, strain and stretching to said sealing strips (40) during the docking operation and during the loading and unloading of docked vehicles. The overlapping construction of said vertically split sealing strips (40) provides for an effective weather and conditioned-air seal between said vehicle (400) and said loading dock doorway structure (300) and/or padding (600). The resilient, abrasion-resistant material of said sealing strips (40) provides for excellent protection to said building structure (100) and to existing doorway padding, cushions and/or shelters (600) from impact and abrasion damage generally associated with loading dock activities.

While the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are defined as follows:

1. A self-positioning, durable, loading dock doorway seal and protector for providing a weather and conditioned-air seal between docking vehicles and loading dock structure and for providing protection to doorway structure, padding and seal material comprising:

a rocker arm assembly having a pair of rocker arms with each arm having an inner end and an outer end and a coincident axis point, counterweight support means, counterweights of slightly more weight than necessary to counterbalance said rocker arm assembly, and a curtain anchoring means;

means for mounting said rocker arm assembly to a loading dock wall;

means for rotatably attaching said rocker arm assembly to said mounting means;

means attached to said mounting means for restraining the rotation of said rocker arm assembly;

means for attaching said counterweight support means to said rocker arms;

a plurality of vertically split and overlapping sealing strips attached at one end to said curtain anchoring means whereby said strips are arranged to form a top curtain section and two side curtain sections which are positioned on said curtain anchoring means to border the top and sides of a loading dock doorway;

means for attaching said strips to said curtain anchoring means; and, weighting means attached to the face end of each sealing strip comprising said side curtain sections to provide for curtain stability and proper sealing tension against the sides of docking vehicles.

2. The apparatus of claim 1, wherein said means for mounting said rocker arm assembly comprises a pair of brackets, generally of "L" shaped configuration, each having two "L" shaped, vertically positioned, spaced, parallel plates attached to a base plate for securing said bracket to a wall or structure.

3. The apparatus of claim 1, wherein said means for rotatably attaching said rocker arm assembly to said mounting means comprises a pin and bushing.

4. The apparatus of claim 1, wherein said coincident axis points of said rocker arms comprises holes of equal diameter and equal spacing located at points generally in the center of said rocker arms.

5. The apparatus of claim 1, wherein said counterweight support means comprises an open-ended, "U" shaped cradle attached to the inner end of each of said rocker arms.

6. The apparatus of claim 1, wherein said counterweights are comprised of heavy metal, rectangular shaped, bars extending between and resting within said counterweight support means.

7. The apparatus of claim 6, wherein said heavy metal, rectangular shaped, bars are fabricated of steel.

8. The apparatus of claim 1, wherein said seal anchoring bar is comprised of a light metal, rectangular shaped, tubular member.

9. The apparatus of claim 8, wherein said light metal, rectangular shaped, tubular member is fabricated of aluminum.

10. The apparatus of claim 1, wherein said vertically split and overlapping sealing strips are comprised of resilient, abrasionresistant material.

11. The apparatus of claim 10, wherein said strips are constructed of flexible polyvinylcloride.

12. The apparatus of claim 1, wherein said means for attaching said vertically split, overlapping sealing strips to said seal anchoring bar comprises bolts and/or bolted plates.

13. The apparatus of claim 1, wherein said weighting means comprises heavy metal, rectangular shaped, plates securely attached to the free ends of the vertically split, overlapping, side curtain section sealing strips.

14. A method for sealing gaps around loading dock doorways while protecting said doorways and related structure from damage caused by docking vehicles and while also providing for increased durability of seal material, said method comprising the steps of:

forming a rocker arm assembly by attaching a connecting means between the outer ends of two rocker arms having coincident axis points and by attaching counterweighting means to, and between, the inner ends of said rocker arms;

attaching vertically split, overlapping curtain sections of resilient, abrasion resistant material to said rocker arm assembly across the length of said connecting means;

attaching said rocker arm assembly, including said vertically split, overlapping curtain sections, to mounting brackets securely attached to a wall just above and to either side of a loading dock doorway;

causing said rocker arm assembly to rotate on its rocker arm axes by engaging said vertically split, overlapping curtain sections with the rear end of a docking vehicle;

tracking the movement of said docking vehicles through the rotation of the rocker arm assembly and the related movement of the curtain sections to the vehicles' docked position;

automatically returning said rocker arm assembly and attached curtain sections to their original position by the action of the counterweighting means.

* * * * *